United States Patent
Goto et al.

(10) Patent No.: US 10,807,609 B2
(45) Date of Patent: Oct. 20, 2020

(54) VEHICLE CONTROL DEVICE

(71) Applicant: HONDA MOTOR CO., LTD., Minato-Ku, Tokyo (JP)

(72) Inventors: Takeru Goto, Wako (JP); Toshiaki Takano, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 139 days.

(21) Appl. No.: 16/162,674

(22) Filed: Oct. 17, 2018

(65) Prior Publication Data

US 2019/0118833 A1    Apr. 25, 2019

(30) Foreign Application Priority Data

Oct. 19, 2017    (JP) .................................. 2017-202453

(51) Int. Cl.
| | |
|---|---|
| *B60W 50/14* | (2020.01) |
| *G05D 1/00* | (2006.01) |
| *B60W 30/16* | (2020.01) |
| *B60W 30/12* | (2020.01) |
| *B60W 50/00* | (2006.01) |

(52) U.S. Cl.
CPC ............ *B60W 50/14* (2013.01); *B60W 30/12* (2013.01); *B60W 30/16* (2013.01); *G05D 1/0061* (2013.01); *B60W 2050/007* (2013.01); *B60W 2050/0081* (2013.01); *G05D 2201/0213* (2013.01)

(58) Field of Classification Search
CPC ...... B60W 50/14; B60W 30/12; B60W 30/16; B60W 2050/007; B60W 2050/0081; G05D 1/0061; G05D 2201/0213
See application file for complete search history.

(56) References Cited

U.S. PATENT DOCUMENTS

| | | | |
|---|---|---|---|
| 10,019,901 B1* | 7/2018 | Fields ..................... | G08G 1/07 |
| 2014/0156133 A1* | 6/2014 | Cullinane ............ | G05D 1/0223 |
| | | | 701/23 |
| 2018/0023966 A1* | 1/2018 | Iwai ..................... | G08G 1/0112 |
| | | | 701/423 |
| 2018/0072315 A1* | 3/2018 | Enthaler ............... | B60W 30/12 |

(Continued)

FOREIGN PATENT DOCUMENTS

| | | |
|---|---|---|
| JP | 2017-061320 A | 3/2017 |
| JP | 2017-174282 A | 9/2017 |

OTHER PUBLICATIONS

Office Action dated Apr. 16, 2019 issued over the corresponding Japanese Patent Application No. 2017-202453 with the machine English translation thereof.

*Primary Examiner* — Hussein Elchanti
(74) *Attorney, Agent, or Firm* — Carrier Blackman & Associates, P.C.; Joseph P. Carrier; Jeddrey T. Gedeon

(57) ABSTRACT

A vehicle control device includes a restricted section setting unit configured to set a restricted section where manual driving is restricted on a scheduled travel route of a host vehicle, and a takeover process unit configured to perform a takeover process regarding handover of automated driving to the manual driving in accordance with a request from a driver of the host vehicle. In a case where the request for the handover is received in the set restricted section, the takeover process unit performs the takeover process that differs depending on at least one of the type of the restricted section, and a distance and a time it takes for the host vehicle to pass through the restricted section.

5 Claims, 6 Drawing Sheets

(56) References Cited

U.S. PATENT DOCUMENTS

2018/0329415 A1* 11/2018 Aoi .................. B60W 60/0051
2019/0251846 A1*  8/2019 Nemeth ................ G08G 1/202
2020/0008028 A1*  1/2020 Yang ..................... G08G 1/012

* cited by examiner

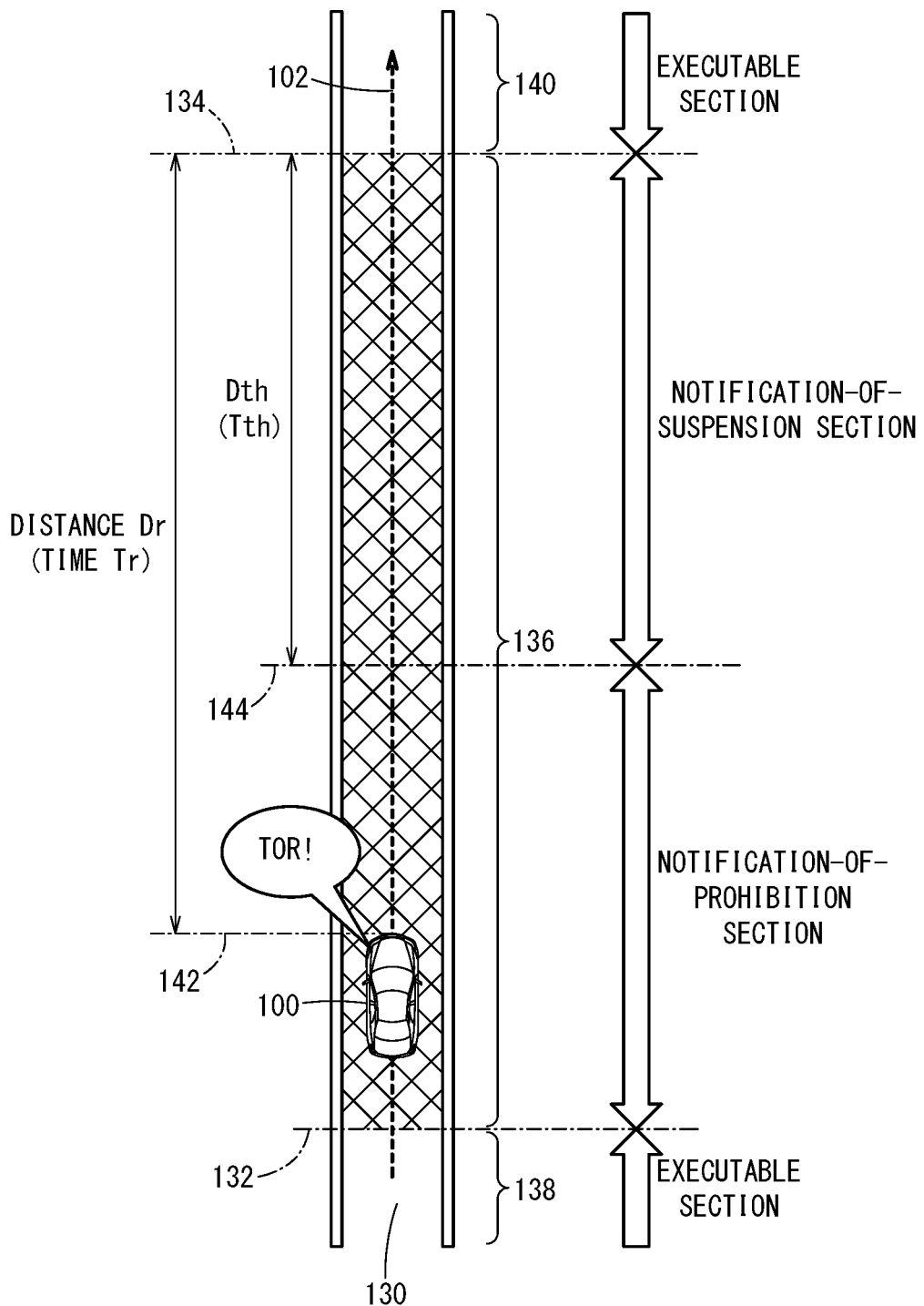

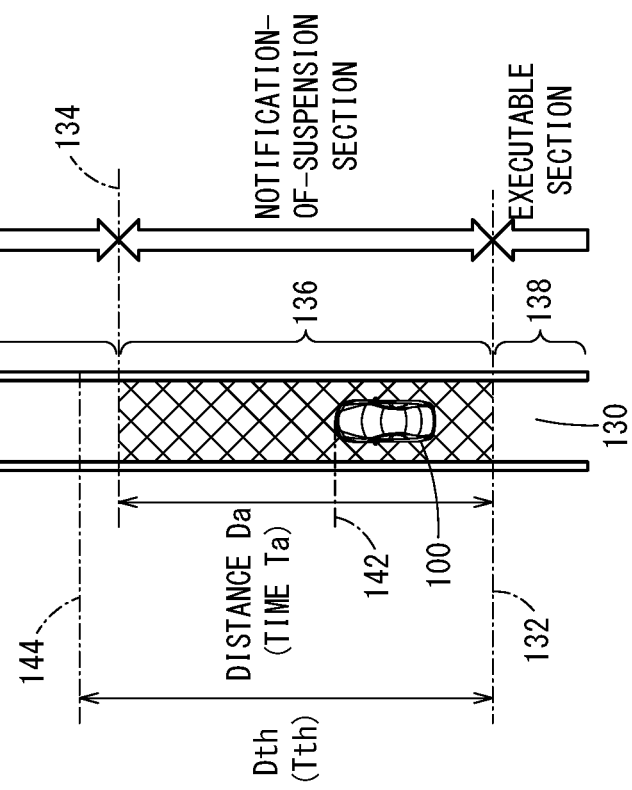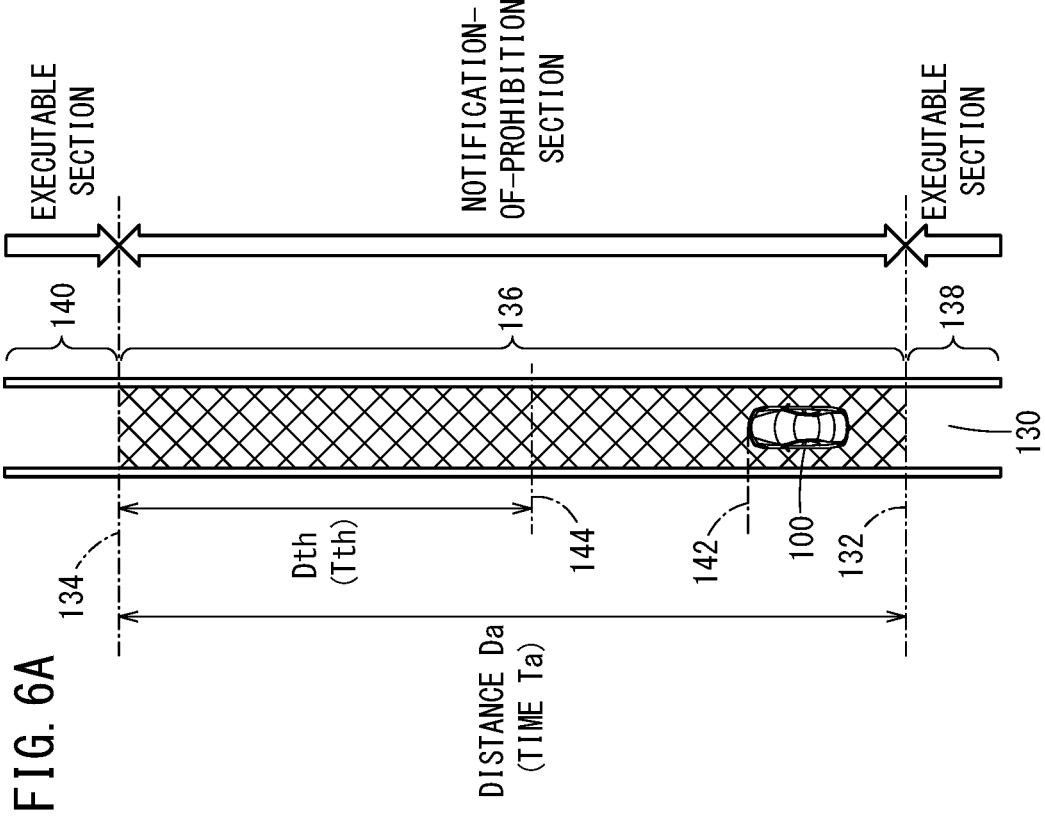
FIG. 6A
FIG. 6B

VEHICLE CONTROL DEVICE

CROSS-REFERENCE TO RELATED APPLICATION

This application is based upon and claims the benefit of priority from Japanese Patent Application No. 2017-202453 filed on Oct. 19, 2017, the contents of which are incorporated herein by reference.

BACKGROUND OF THE INVENTION

Field of the Invention

The present invention relates to a vehicle control device that performs travel control for a host vehicle at least partially automatically.

Description of the Related Art

Techniques of performing a travel control of a driver's own vehicle (which will be also referred to as a host vehicle) at least partially automatically (automated driving technique or driving assistance technique) have conventionally been developed. For example, various timing control techniques for transitioning between driving modes smoothly have been developed.

Japanese Laid-Open Patent Publication No. 2017-061320 (paragraph [0065], etc.) suggests a device that, in a case where a predetermined switching condition is satisfied, can forcibly switch the driving mode from a manual driving mode to an automated driving mode. In a specific example, if the switching condition is "railroad crossing", a forcible-switching canceling condition is "passing railroad crossing".

SUMMARY OF THE INVENTION

However, each driver does not necessarily understand the existence or content of such a switching condition completely and correctly. For example, in the aforementioned example of "passing railroad crossing", even though the own vehicle is traveling still in a restricted section, the driver may mistakenly think that the vehicle has reached an end position of the railroad crossing, and consequently request the handover to the manual driving.

However, the device suggested in Japanese Laid-Open Patent Publication No. 2017-061320 (paragraph [0065], etc.) will not receive such a request for the handover to the manual driving in the restricted section, and therefore the driver may feel sense of discomfort or bothered.

The present invention has been made in order to solve the above problem, and an object is to provide a vehicle control device that can appropriately reflect a driver's takeover intention even if the host vehicle is driving in a restricted section where the manual driving is restricted.

A vehicle control device according to the present invention is a device configured to perform travel control of a host vehicle at least partially automatically, including: a restricted section setting unit configured to set a restricted section where manual driving is restricted on a scheduled travel route of the host vehicle; and a takeover process unit configured to perform a takeover process regarding handover of automated driving to the manual driving, in accordance with a request from a driver of the host vehicle, wherein in a case where a request for the handover is received in the restricted section set by the restricted section setting unit, the takeover process unit is configured to perform the takeover process that differs depending on at least one of a type of the restricted section, and a distance and a time it takes for the host vehicle to pass through the restricted section.

In this manner, the takeover process that differs depending on at least one of the type of the restricted section, and the distance and the time it takes for the host vehicle to pass through the restricted section is performed. Thus, it is possible to perform the takeover process regarding the handover smoothly in consideration of the situation until the host vehicle passes through the restricted section. Even while the host vehicle is traveling in the restricted section where the manual driving is restricted, the driver's takeover intention can be reflected as appropriate.

In addition, if a distance from a position of the host vehicle where the request from the driver is received to an end position of the restricted section and/or a time from when the request from the driver is received until when the host vehicle reaches the end position of the restricted section is smaller than a threshold, the takeover process unit may perform the takeover process after the host vehicle exits the restricted section. Thus, the driver's intention to change to the manual driving around the time when the host vehicle exits the restricted section can be reflected correctly.

In addition, if the distance and/or the time is larger than the threshold, the takeover process unit may invalidate the request from the driver. Thus, in consideration of the possibility that the driver does not recognize that the host vehicle is traveling in the restricted section, the driver's intention can be reconfirmed.

The vehicle control device may further include a state recognition unit configured to recognize a state of the driver, wherein the takeover process unit may set the threshold that is different depending on the state of the driver recognized by the state recognition unit.

In addition, if the type of the restricted section is a railroad crossing, the takeover process unit may perform the takeover process after the host vehicle exits the restricted section. In consideration of the fact that it takes a relatively short time to pass through the railroad crossing, the takeover process is performed without reconfirming the driver's intention, and thus the driver can further enjoy the convenience in driving.

By the vehicle control device according to the present invention, the driver's takeover intention can be reflected as appropriate even if the host vehicle is traveling in the restricted section where the manual driving is restricted.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a diagram for describing a suspending condition of TOR; and

FIG. 6A and FIG. 6B are diagrams for describing a suspending condition of TOR.

DESCRIPTION OF THE PREFERRED EMBODIMENTS

A preferred embodiment of a vehicle control device according to the present invention will be hereinafter described with reference to the attached drawings.

[Structure of Vehicle Control Device 10]

Figure 1:
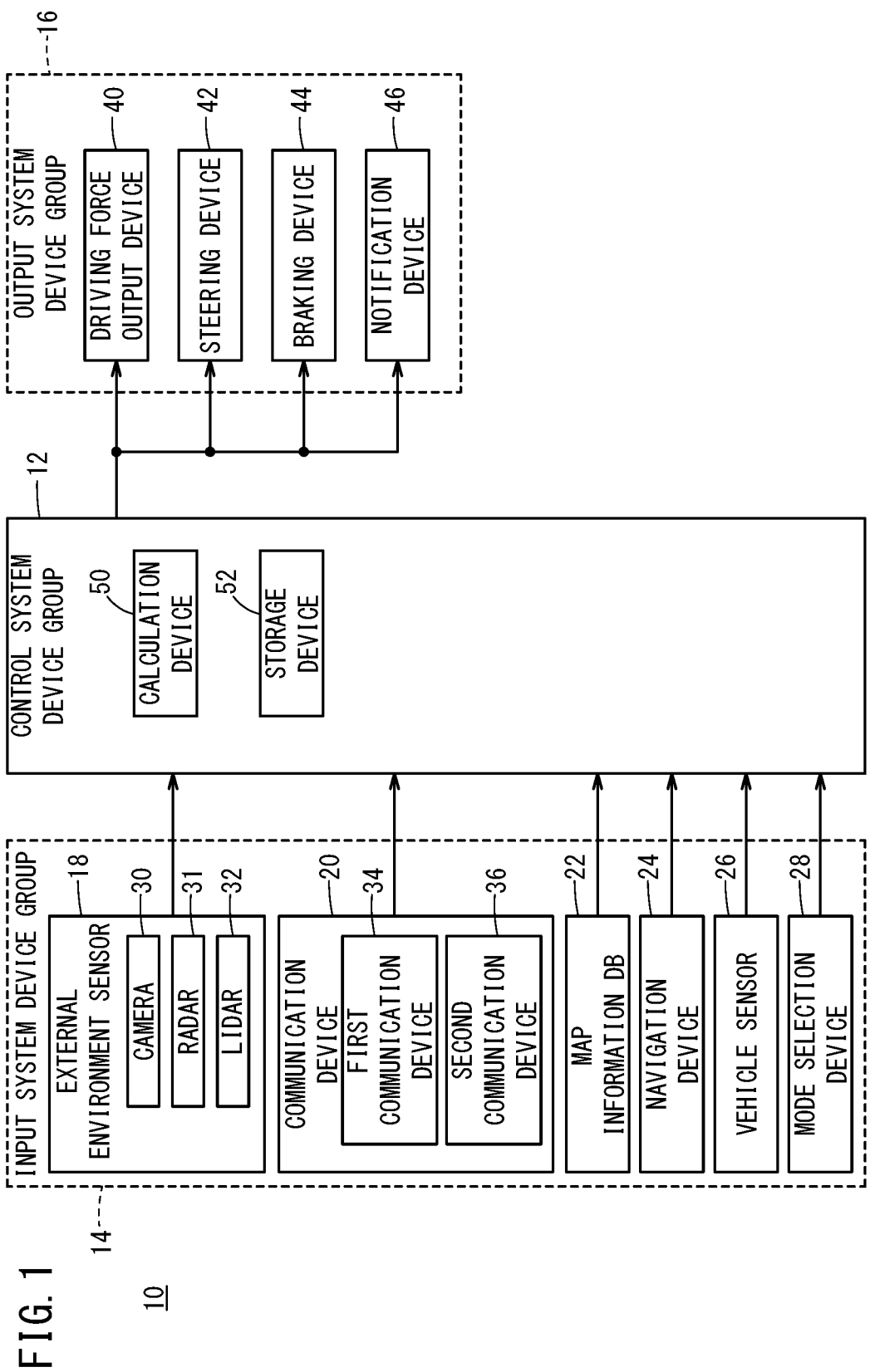
FIG. 1 is a block diagram illustrating a structure of a vehicle control device according to an embodiment of the present invention.

FIG. 1 is a block diagram illustrating a structure of a vehicle control device 10 according to an embodiment of the present invention. The vehicle control device 10 is incorporated in a vehicle (a driver's own vehicle 100 in FIG. 4, etc., which will be also referred to as a host vehicle) and controls driving of the vehicle either automatically or manually. "Automated driving" implies a concept that includes not only "fully automated driving" in which the travel control of the vehicle is performed entirely automatically, but also "partial automated driving" in which the travel control is performed partially automatically.

The vehicle control device 10 includes a control system device group 12 that collectively controls the driving of the vehicle, a device group (hereinafter referred to as an input system device group 14) that performs an input function of the control system device group 12, and a device group (hereinafter referred to as an output system device group 16) that performs an output function of the control system device group 12.

<Specific Structure of Input System Device Group 14>

The input system device group 14 includes: an external environment sensor 18 that detects a state of a periphery (external environment) of the vehicle; a communication device 20 that transmits and receives information to and from various communication devices outside the vehicle; a high-precision map database (hereinafter, map information DB 22) that acquires map information indicating a high-precision map; a navigation device 24 that generates a travel route to a destination and measures a travel position of the vehicle; a vehicle sensor 26 that detects a state of the vehicle; and a mode selection device 28 that selects a driving mode.

The external environment sensor 18 includes one or more cameras 30 that capture images of the external environment, one or more radars 31 that detect the distance and the relative speed between the vehicle and another object, and one or more LIDARs 32 (Light Detection and Ranging/Laser Imaging Detection and Ranging).

The communication device 20 includes a first communication device 34 that performs vehicle-to-vehicle communication with another vehicle, and a second communication device 36 that performs road-to-vehicle communication with a road-side device. The navigation device 24 includes a satellite navigation system and a self-contained navigation system. The vehicle sensor 26 includes various sensors that detect a behavior of the vehicle, such as a vehicle speed sensor, an acceleration sensor, a yaw rate sensor, and an inclination sensor, various sensors that detect an operation state of the vehicle, and various sensors that detect a state of a driver.

The mode selection device 28 includes a hardware switch, a software switch by a touch operation or voice input, and an operation device (specifically, accelerator pedal, steering wheel, brake pedal).

<Specific Structure of Output System Device Group 16>

The output system device group 16 includes a driving force output device 40, a steering device 42, a braking device 44, and a notification device 46.

The driving force output device 40 includes a driving force output electronic control unit (ECU), and a driving source such as an engine or a driving motor. The driving force output device 40 generates a driving force in response to a driver's operation on an accelerator pedal or a driving control command that is output from the control system device group 12.

The steering device 42 includes an electric power steering system (EPS)-ECU, and an EPS actuator. The steering device 42 generates a steering force in response to a driver's operation of a steering wheel or a steering control command that is output from the control system device group 12.

The braking device 44 includes a braking ECU and a braking actuator. The braking device 44 generates a braking force in response to a driver's operation of a braking pedal or a braking control command that is output from the control system device group 12.

The notification device 46 includes a notification ECU and an information transmission device (such as a display device, an acoustic device, or a tactile device). The notification device 46 notifies a driver in response to a notification command that is output from the control system device group 12 or another ECU (for example, provides information through any of five senses including visual and auditory senses).

<Specific Structure of Control System Device Group 12>

The control system device group 12 includes one or more ECUs, and includes a calculation device 50 such as a processor and a storage device 52 such as a ROM or a RAM. The control system device group 12 achieves various functions by the calculation device 50 executing programs stored in the storage device 52.

Figure 2:
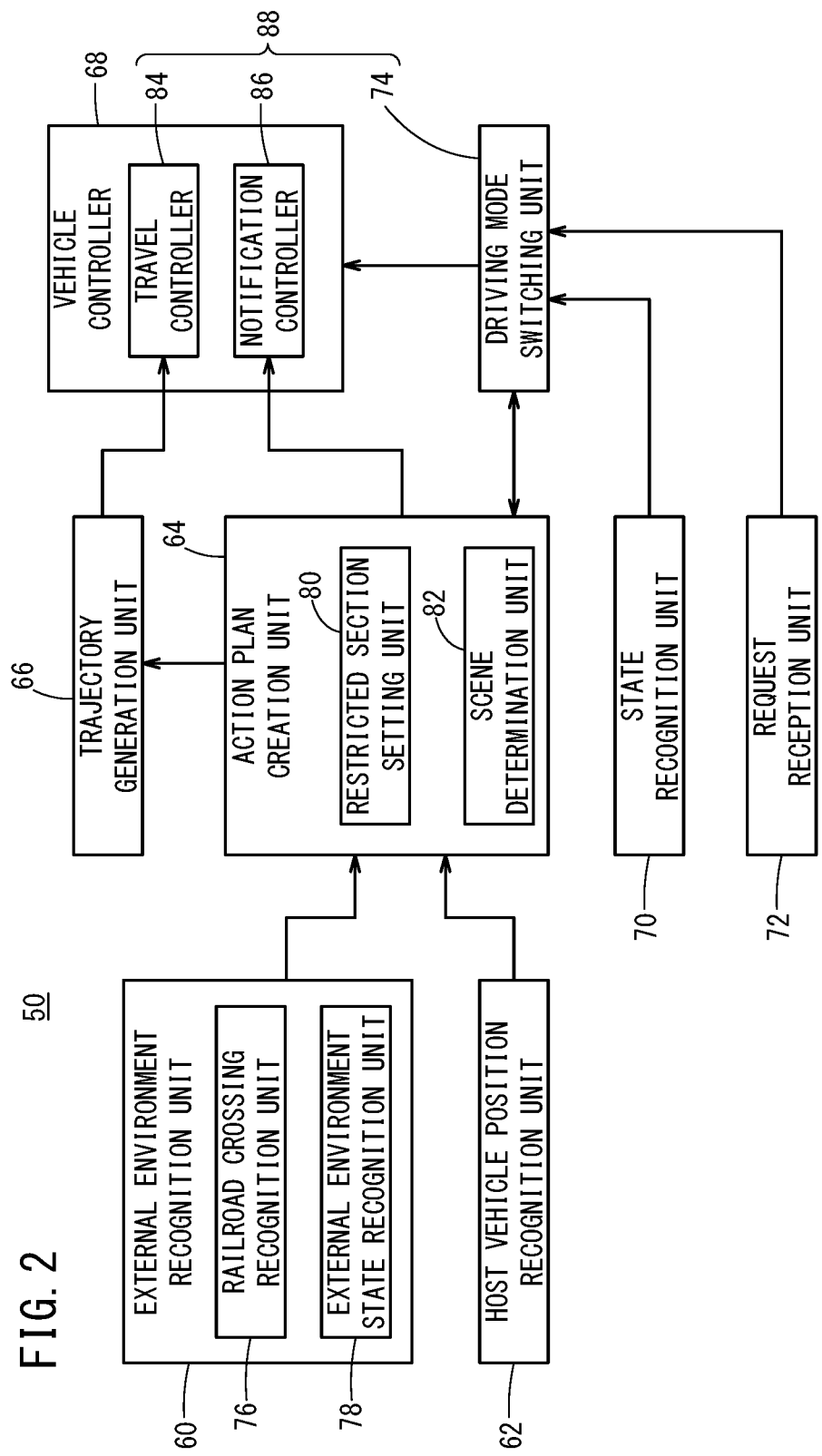
FIG. 2 is a function block diagram of a calculation device illustrated in FIG. 1.

FIG. 2 is a function block diagram of the calculation device 50 illustrated in FIG. 1. This calculation device 50 is configured to perform various functions of an external environment recognition unit 60, a host vehicle position recognition unit 62, an action plan creation unit 64, a trajectory generation unit 66, a vehicle controller 68, a state recognition unit 70, a request reception unit 72, and a driving mode switching unit 74.

The external environment recognition unit 60 recognizes a situation and an object around the vehicle on the basis of the information output from the external environment sensor 18. This external environment recognition unit 60 includes a railroad crossing recognition unit 76 and an external environment state recognition unit 78.

The host vehicle position recognition unit 62 recognizes an absolute position of the vehicle or a relative position of the vehicle on the high-precision map (hereinafter also referred to as host vehicle position) on the basis of the information output from the navigation device 24 and the map information DB 22.

The action plan creation unit 64 creates an action plan (a time series of events for each travel section) in accordance with the situation of the vehicle on the basis of recognition results from the external environment recognition unit 60 and the host vehicle position recognition unit 62, and updates the content of the action plan as necessary. The action plan creation unit 64 includes a restricted section setting unit 80 and a scene determination unit 82.

The trajectory generation unit 66 generates a travel trajectory (a time series of target behaviors) in accordance with the action plan created by the action plan creation unit 64 on the basis of the recognition results from the external environment recognition unit 60 and the host vehicle position recognition unit 62.

The vehicle controller 68 instructs the output system device group 16 (FIG. 1) to operate, on the basis of a creation result from the action plan creation unit 64 or a generation result from the trajectory generation unit 66. The vehicle controller 68 includes a travel controller 84 that performs a travel control of the vehicle, and a notification controller 86 that performs a notification control for the driver.

The state recognition unit 70 recognizes a state of a driver in the vehicle on the basis of a detection result from the vehicle sensor 26. For example, the state recognition unit 70 recognizes whether the driver is in a normal condition (a driving possible state), whether the driver is sleepy, or whether the driver sees the glare of dazzling light, on the basis of the image information of an in-vehicle camera.

In order to transition from the automated driving to the manual driving, on the basis of a change in operation state of the mode selection device 28, the request reception unit 72 receives a takeover request (TOR) that requests the takeover by a driving subject, i.e., the TOR for requesting that the responsibility for driving be handed over to (taken over by) the driving subject.

On the basis of the recognition result from the state recognition unit 70 or the reception result from the request reception unit 72, the driving mode switching unit 74 switches between a plurality of driving modes including the automated driving mode and the manual driving mode, and notifies the vehicle controller 68 that the driving mode has been switched.

That is to say, the driving mode switching unit 74, the travel controller 84, and the notification controller 86 function as a takeover process unit 88 that performs a takeover process regarding the handover from the automated driving to the manual driving (change of driving subject) in accordance with the request (TOR) from the driver. This takeover process specifically includes a process of notifying that the handover is preformed, a process of notifying that the handover has actually been performed, or a process of canceling the automated driving mode.

[Operation of Vehicle Control Device 10]

The vehicle control device 10 according to the present embodiment is structured as above. Subsequently, description will be given of an operation of the vehicle control device 10 around the restricted section 120 (FIG. 4) and the restricted section 136 (FIG. 5 to FIG. 6B) mainly with reference to a flowchart in FIG. 3. In this example, the host vehicle 100 incorporating the vehicle control device 10 travels by automated driving.

Figure 4:
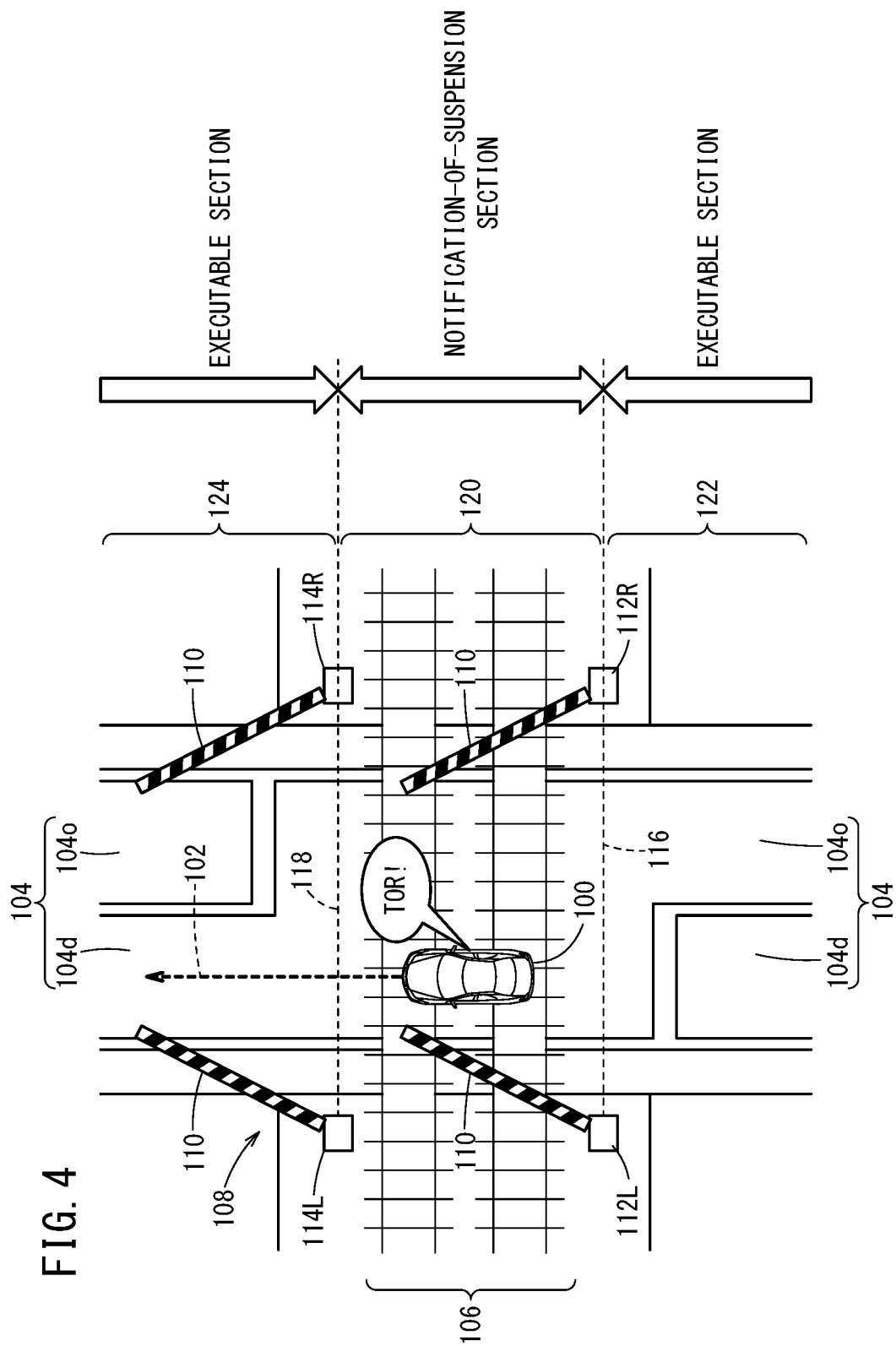
FIG. 4 is a schematic view illustrating a driving scene around a railroad crossing.

FIG. 4 is a schematic view illustrating a driving scene around a railroad crossing 108. The host vehicle 100 will pass a point where a road 104 and a railroad track 106 intersect (that is, a railroad crossing 108), while traveling straight along a scheduled travel route 102 that is shown by a dashed arrow. Here, the scheduled travel route 102 means a route where the host vehicle 100 is scheduled to travel.

In this drawing, vehicles drive on a road 104 in a country or a region where drivers should keep to "the left side" of the road. The road 104 includes two lanes: a travel lane 104*d* where the host vehicle 100 is scheduled to travel, and an opposite lane or oncoming lane 104*o* that is opposite to the travel lane 104*d*. The railroad track 106 including two lanes is a track where a railroad vehicle (not shown) travels.

On an entry side (i.e., in front) of the railroad crossing 108, two crossing gates 112R, 112L each having a gate bar 110 are disposed to face each other with the road 104 interposed therebetween. Each of the crossing gates 112R, 112L is configured to move the gate bar 110 up and down.

On an exit side (i.e., in the back) of the railroad crossing 108, two crossing gates 114R, 114L each having the gate bar 110 are disposed to face each other with the road 104 interposed therebetween. Each of the crossing gates 114R, 114L is configured to move the gate bar 110 up and down.

Figure 3:
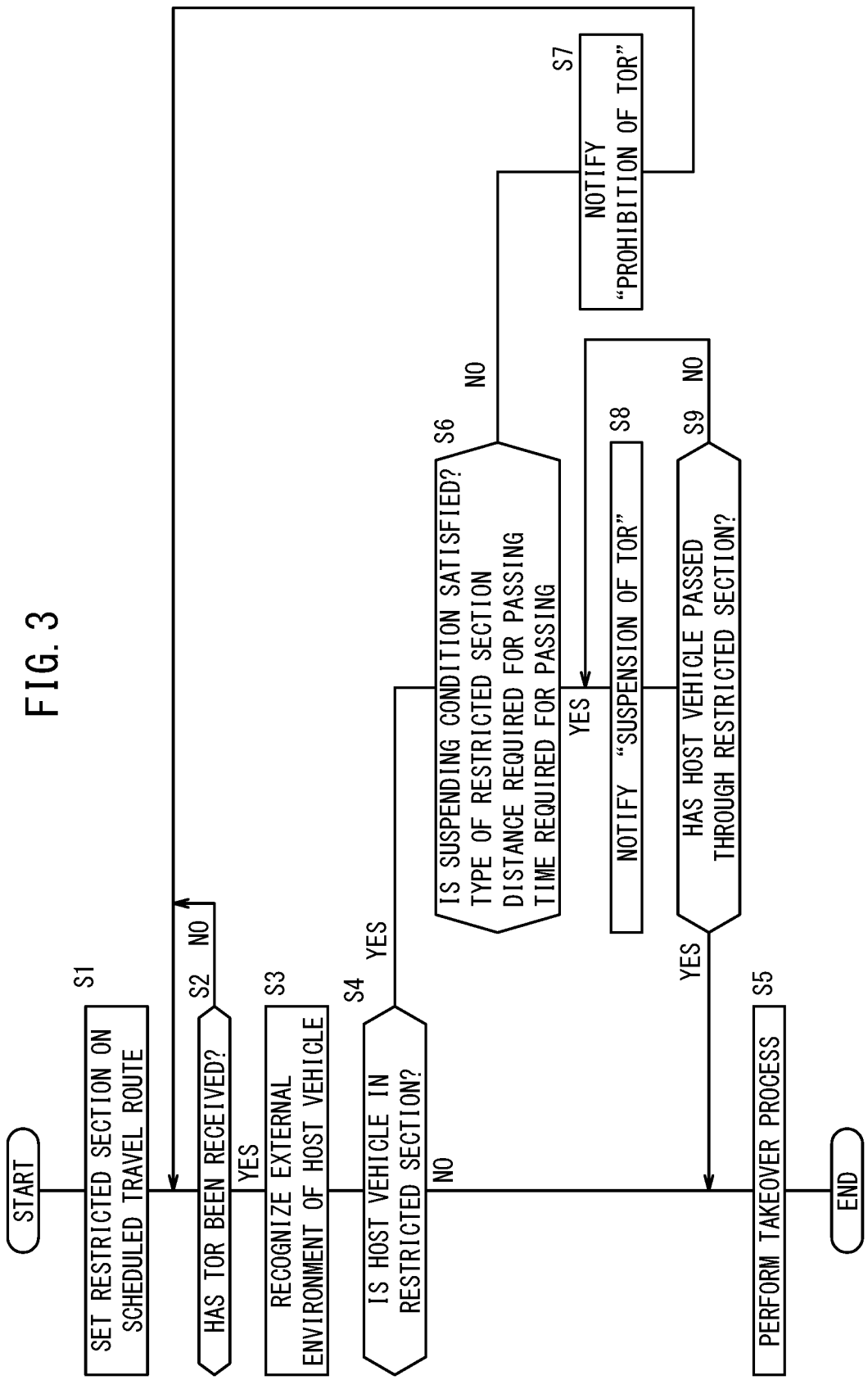
FIG. 3 is a flowchart for describing an operation of the calculation device illustrated in FIG. 2.

In step S1 in FIG. 3, the restricted section setting unit 80 sets at least one section where the manual driving is restricted on the scheduled travel route 102 of the host vehicle 100 (this section will hereinafter be referred to as a restricted section 120). This restriction may be imposed in, for example, any of a case where the automated driving is desirable for smooth travel, and a case where the manual driving is restricted because of an agreement including regulations.

In step S2, the request reception unit 72 determines whether the takeover request (TOR) by the driver has been received. If TOR has not been received yet (step S2: NO), the process remains in step S2 until this request is received. On the other hand, if the reception of TOR has been determined (step S2: YES), the process proceeds to the next step S3.

In step S3, the external environment recognition unit 60 recognizes the situation and the object around the host vehicle 100 on the basis of the information output from the external environment sensor 18.

For example, the railroad crossing recognition unit 76 recognizes the presence or absence and the size of the railroad crossing 108 on the scheduled travel route 102 of the host vehicle 100, the position of a stop line, the position and open/close state of the crossing gates 112R(L), 114R(L), and the like, on the basis of the image information of the camera 30 or the map information (high-precision map) read out from the map information DB 22.

For example, the external environment state recognition unit 78 recognizes an overall road environment, such as the shape and the width of the road, the position of a lane mark, the number of lanes, the width of the lane, the signaling state of the traffic light, and the like, on the basis of the image information of the camera 30 or the map information (high-precision map) read out from the map information DB 22.

In step S4, the scene determination unit 82 determines whether the host vehicle 100 is in the restricted section 120 set in step S1. Specifically, the scene determination unit 82 can determine a positional relation between the host vehicle 100 and the restricted section 120 by referring to the host vehicle position recognized by the host vehicle position recognition unit 62 and the setting content set by the restricted section setting unit 80.

In the example of FIG. 4, the restricted section 120 extending from a start position 116 (i.e., a start point) to an end position 118 (i.e., an end point) is set on the scheduled travel route 102. Here, the start position 116 corresponds to a position indicated by a straight line connecting between the two crossing gates 112R, 112L on the entry side. Additionally, the end position 118 corresponds to a position indicated by a straight line connecting between the two crossing gates 114R, 114L on the exit side. Note that normal sections 122, 124 correspond to travel sections other than the restricted section 120 on the scheduled travel route 102.

For example, before or after the host vehicle 100 passes the railroad crossing 108, the host vehicle 100 is not in the restricted section 120 (step S4: NO), and then the process proceeds to step S5.

In step S5, the takeover process unit 88 performs the takeover process regarding the handover from the automated driving to the manual driving instantly in accordance with the TOR received in step S2. Thus, the driving subject is changed from the vehicle control device 10 to the driver (i.e., the responsibility of driving is handed over from the vehicle control device to the driver), and the vehicle control device 10 starts the travel control of the manual driving mode.

On the other hand, in the example of FIG. 4, the host vehicle 100 is in the restricted section 120 (step S4: YES), and thus, the process proceeds to step S6.

In step S6, the driving mode switching unit 74 determines whether a condition for suspending the handover of the driving subject temporarily (this condition is hereinafter referred to as a suspending condition) is satisfied. This suspending condition is specifically related to at least one of [1] the type of restricted section 120, [2] a distance Dr the host vehicle 100 travels until passing through the restricted section 136 (i.e., a distance it takes for the host vehicle 100 to pass through the restricted section 136), and [3] a time Tr it takes for the host vehicle 100 to pass through the restricted section 136.

[1] The first individual condition is related to the type of restricted section 120 (FIG. 4). For example, the driving mode switching unit 74 determines that the individual condition is satisfied when the restricted section 120 as a determination object belongs to a particular type of section, and determines that the individual condition is not satisfied when the restricted section 120 does not belong to the particular type of section. Here, the particular type of section is a type of section for which it is estimated that the time required for the vehicle to pass through the section is relatively short, and one of the specific examples is "railroad crossing".

[2] The second individual condition is related to the remaining distance before the host vehicle 100 passes through the restricted section 136 (this distance is hereinafter simply referred to as "distance Dr"). A specific determination method is described below with reference to FIG. 5.

As illustrated in FIG. 5, the host vehicle 100 travels following a substantially straight travel lane 130 along the scheduled travel route 102 shown by a dashed arrow. On the scheduled travel route 102, the restricted section 136 in which a start position 132 is a start point and an end position 134 is an end point is set. Note that normal sections 138, 140 correspond to travel sections other than the restricted section 136 on the scheduled travel route 102.

Here, the distance Dr is defined by a distance from the host vehicle position when TOR is received (this position is hereinafter referred to as a request position 142) to the end position 134. The driving mode switching unit 74 determines a magnitude relation between the distance Dr calculated from the request position 142 and a threshold Dth calculated from a boundary position 144. More specifically, the driving mode switching unit 74 determines that the individual condition is satisfied when 0<Dr≤Dth, and determines that the individual condition is not satisfied when Dr>Dth.

[3] The third individual condition is related to the remaining time before the host vehicle 100 passes through the restricted section 136 (this is hereinafter simply referred to as "time Tr"). This time Tr is defined by a time required for the host vehicle 100 to reach the end position 134 from the time point when TOR is received. For example, the time Tr is obtained by dividing the distance Dr by the travel speed of the host vehicle 100.

The driving mode switching unit 74 determines a magnitude relation between the time Tr calculated from the request position 142 and the threshold Tth calculated from the boundary position 144. More specifically, the driving mode switching unit 74 determines that the individual condition is satisfied when 0<Tr≤Tth, and determines that the individual condition is not satisfied when Tr>Tth.

[4] The definitions of the distance Dr and the time Tr are not limited to those calculated from the request position 142 in the example of FIG. 5. For example, a distance Da and a time Ta that are calculated from the start position 132 may be used.

As illustrated in FIGS. 6A and 6B, the distance Da is defined by a distance from the start position 132 to the end position 134 (that is, the entire length of the restricted section 136) regardless of the request position 142. In this case, the driving mode switching unit 74 determines that the individual condition is satisfied when 0<Da≤Dth (FIG. 6B), and determines that the individual condition is not satisfied when Da>Dth (FIG. 6A).

Similarly, the time Ta is defined by a time required for the host vehicle 100 to travel from the start position 132 to the end position 134 (that is, a time required to pass through the restricted section 136) regardless of the time point when TOR is received. In this case, the driving mode switching unit 74 determines that the individual condition is satisfied when 0<Ta≤Tth, and determines that the individual condition is not satisfied when Ta>Tth.

[5] In FIG. 5 to FIG. 6B, the thresholds Dth, Tth are not limited to fixed values and may be variable values. For example, the driving mode switching unit 74 sets the thresholds Dth, Tth that are different depending on the state of the driver recognized by the state recognition unit 70. In particular, if it is recognized that the driver is sleepy, the driving mode switching unit 74 may set the threshold to be smaller than in the case where the driver is not sleepy, based on the fact that the sleepy drivers are liable to have a shorter attention span.

In this manner, the driving mode switching unit 74 determines whether the suspending condition including one of the individual conditions or a combination of two or more thereof is satisfied (step S6).

If the suspending condition is not satisfied (step S6: NO), the process proceeds to step S7, and if the suspending condition is satisfied (step S6: YES), the process proceeds to step S8.

In step S7, the takeover process unit 88 (notification controller 86) performs the notification control to notify the driver or the like that the handover of the driving subject is prohibited, in accordance with an instruction signal from the driving mode switching unit 74. After that, the takeover process unit 88 invalidates or disables TOR received in step S2, and the process returns to step S2 again and remains therein until the next TOR is received.

On the other hand, in step S8, the takeover process unit 88 (notification controller 86) performs the notification control to notify the driver or the like that the handover of the driving subject is temporarily suspended, in accordance with the instruction signal from the driving mode switching unit 74. After that, the process proceeds to the next step S9.

In step S9, the driving mode switching unit 74 determines whether the host vehicle 100 has passed through the restricted section 120, 136. Specifically, the driving mode switching unit 74 can grasp a time point at which the host vehicle 100 has reached the end position 118, 134 on the basis of the determination result from the scene determination unit 82.

If the passing-through has not been determined yet (step S9: NO), steps S8 and S9 are sequentially repeated until the host vehicle 100 passes through the restricted section 120, 136. On the other hand, if the passing-through has been determined (step S9: YES), the process proceeds to step S5.

In step S5, the takeover process unit 88 releases the suspension of TOR in step S8 and performs the takeover process regarding the handover from the automated driving to the manual driving. Thus, the driving subject is handed over from the vehicle control device 10 to the driver, and the vehicle control device 10 starts the travel control by the manual driving mode. Thus, the flowchart in FIG. 3 is brought to an end.

In summary, in the example in FIG. 4, [1] the normal section 122 to the start position 116 or the normal section 124 from the end position 118 corresponds to "executable section" where TOR is received instantly. [2] The restricted section 120 from the start position 116 to the end position 118 corresponds to "notification-of-suspension section" where TOR is suspended temporarily and the suspension is notified to the driver or the like.

In the example in FIG. 5, [1] the normal section 138 to the start position 132 or the normal section 140 from the end position 134 corresponds to "executable section" where TOR is received instantly. [2] The travel section from the start position 132 to the boundary position 144 (a part of the restricted section 136) corresponds to "notification-of-prohibition section" where TOR is invalidated (prohibited) and this prohibition is notified. [3] The travel section from the boundary position 144 to the end position 134 (a part of the restricted section 136) corresponds to "notification-of-suspension section" where TOR is suspended temporarily and the suspension is notified.

In addition, in the example in FIG. 6A, [1] the travel section to the start position 132 or the travel section from the end position 134 corresponds to "executable section" where TOR is received instantly. [2] The travel section from the start position 132 to the end position 134 corresponds to "notification-of-prohibition section" where TOR is invalidated (prohibited) and the prohibition is notified.

In the example in FIG. 6B, [1] the travel section to the start position 132 or the travel section from the end position 134 corresponds to "executable section" where TOR is received instantly. [2] The travel section from the start position 132 to the boundary position 144 corresponds to "notification-of-suspension section" where TOR is suspended temporarily and the suspension is notified.

[Effects of Vehicle Control Device 10]

As described above, the vehicle control device 10 is the device configured to perform the travel control of the host vehicle 100 at least partially automatically and including: [1] the restricted section setting unit 80 configured to set the restricted section 120, 136 where the manual driving is restricted on the scheduled travel route 102 of the host vehicle 100; and [2] the takeover process unit 88 configured to perform the takeover process regarding the handover of the automated driving to the manual driving, in accordance with the request from the driver of the host vehicle 100. [3] In the case where the request for the handover is received in the set restricted section 120, 136, the takeover process unit 88 is configured to perform the takeover process that differs depending on at least one of the type of the restricted section 120, 136, and the distance and the time it takes for the host vehicle 100 to pass through the restricted section 120, 136.

In this vehicle control method, one or more computers perform the following steps of: [1] setting the restricted section 120, 136 where the manual driving is restricted on the scheduled travel route 102 of the host vehicle 100 (step S1); and [2] performing the takeover process regarding the handover from the automated driving to the manual driving in accordance with the request (TOR) from the driver of the host vehicle 100 (step S5). In [3] step S5, in the case where the request for the handover is received in the set restricted section 120, 136, the takeover process that differs depending on at least one of the type of the restricted section 120, 136, and the distance and the time it takes for the host vehicle 100 to pass the restricted section 120, 136 is performed.

In this manner, the takeover process that differs depending on at least one of the type of the restricted section 120, 136, and the distance and the time it takes for the host vehicle 100 to pass through the restricted section 120, 136 is performed. Thus, it is possible to perform the takeover process regarding the handover smoothly in consideration of the situation until the host vehicle 100 passes through the restricted section 120, 136. Even while the host vehicle 100 is traveling in the restricted section 120, 136 where the manual driving is restricted, the driver's takeover intention can be reflected as appropriate.

If the distance Dr from the position of the host vehicle where the request from the driver is received (request position 142) to the end position 134 of the restricted section 136 and/or the time Tr from when the request from the driver is received until when the host vehicle 100 reaches the end position 134 of the restricted section 136 is smaller than the threshold (Dth/Tth), the takeover process unit 88 may perform the takeover process after the host vehicle 100 exits the restricted section 136. Thus, the driver's intention to change to the manual driving around the time when the host vehicle 100 exits the restricted section 136 can be reflected correctly.

In addition, if the distance Dr and/or the time Tr is larger than the threshold (Dth/Tth), the takeover process unit 88 may invalidate the request from the driver. Thus, in consideration of the possibility that the driver does not recognize that the host vehicle 100 is traveling in the restricted section 136, the driver's intention can be reconfirmed.

In addition, the takeover process unit 88 may set the threshold that is different depending on the state of the driver recognized by the state recognition unit 70. In particular, if it is recognized that the driver is sleepy, the takeover process unit 88 may set the threshold to be smaller than in the case where the driver is not sleepy, in consideration of the fact that the sleepy drivers are liable to have a shorter attention span.

If the type of the restricted section 120 is the railroad crossing 108, the takeover process unit 88 may perform the takeover after the host vehicle 100 exits the restricted section 120. In consideration of the fact that it takes a relatively short time to pass through the railroad crossing 108, the takeover process is performed without reconfirming the driver's intention, and thus the driver can further enjoy the convenience in driving.

[Supplement]

The present invention is not limited to the embodiment above, and can be changed freely without departing from the scope of the present invention. Alternatively, the structures may be combined arbitrarily within a range in which there is no technical inconsistency.

The present invention is also applicable to a case in which a vehicle travels on the right side of the road.

What is claimed is:

1. A vehicle control device configured to perform travel control of a host vehicle at least partially automatically, comprising one or more processors, wherein the one or more processors are configured to:
    set a restricted section where manual driving is restricted on a scheduled travel route of the host vehicle; and
    perform a takeover process regarding handover of automated driving to the manual driving, in accordance with a request from a driver of the host vehicle,
    wherein in a case where a request for the handover is received in the restricted section, the one or more processors are further configured to perform the takeover process that differs depending on at least one of a type of the restricted section, and a distance and a time that the host vehicle takes to pass through the restricted section.

2. The vehicle control device according to claim 1, wherein if a distance from a position of the host vehicle where the request from the driver is received to an end position of the restricted section and/or a time from when the request from the driver is received until when the host vehicle reaches the end position of the restricted section is smaller than a threshold, the one or more processors are further configured to perform the takeover process after the host vehicle exits the restricted section.

3. The vehicle control device according to claim 2, wherein if the distance and/or the time is larger than the threshold, the one or more processors are further configured to invalidate the request from the driver.

4. The vehicle control device according to claim 2, wherein the one or more processors are further configured to recognize a state of the driver,
    wherein the one or more processors are further configured to set the threshold that is different depending on the state of the driver.

5. The vehicle control device according to claim 1, wherein if the type of the restricted section is a railroad crossing, the one or more processors are further configured to perform the takeover process after the host vehicle exits the restricted section.

* * * * *